Dec. 24, 1929.  C. KAJIWARA  1,741,023
KAMABOKO MOLDING MACHINE
Filed April 2, 1928   4 Sheets-Sheet 1
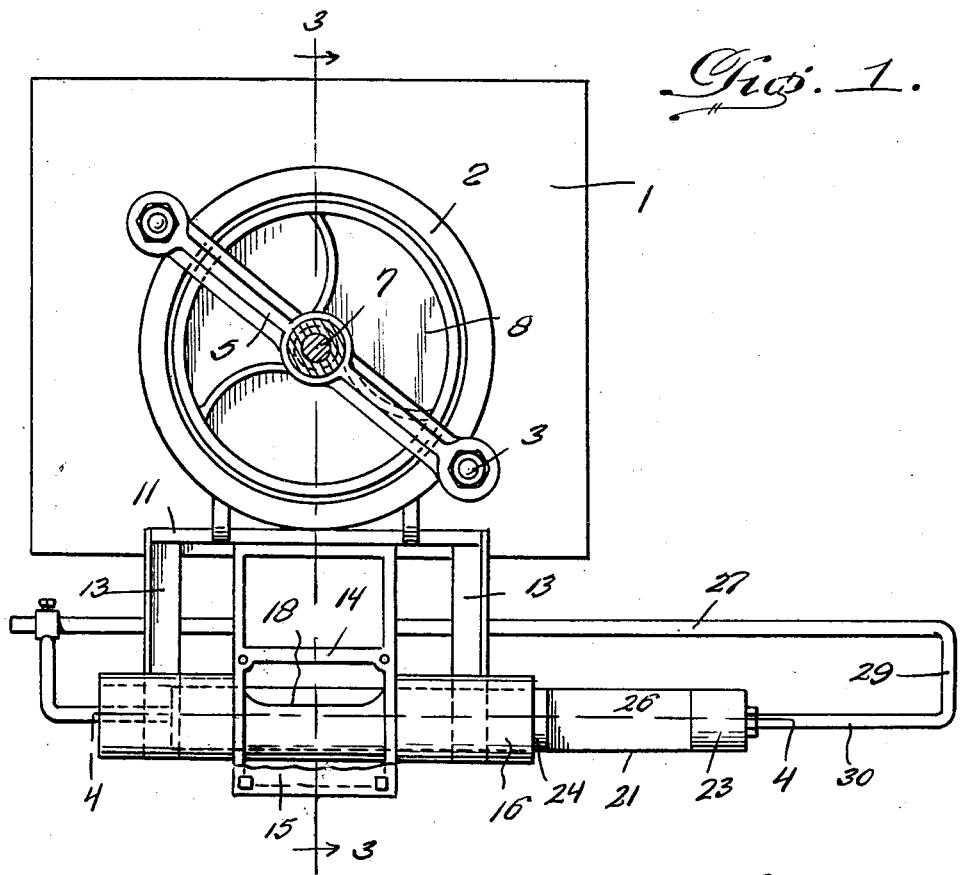
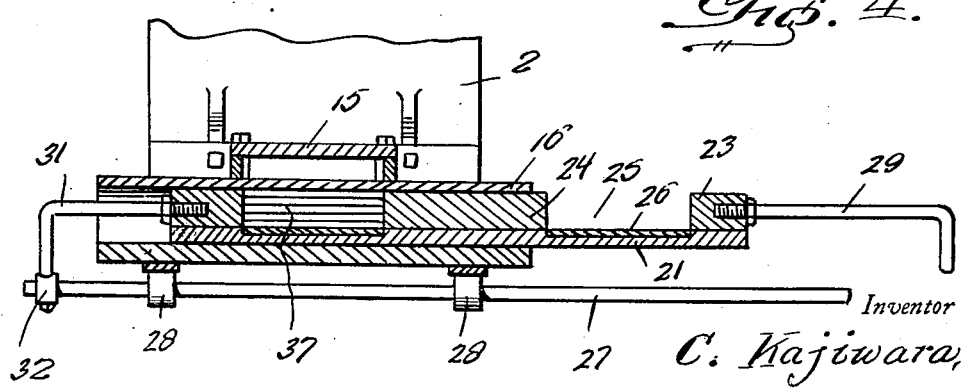
Inventor
C. Kajiwara,
By Clarence A. O'Brien
Attorney Dec. 24, 1929.   C. KAJIWARA   1,741,023
KAMABOKO MOLDING MACHINE
Filed April 2, 1928   4 Sheets-Sheet 2

Inventor
*C. Kajiwara*

By *Clarence A. O'Brien*
Attorney

Dec. 24, 1929. C. KAJIWARA 1,741,023
KAMABOKO MOLDING MACHINE
Filed April 2, 1928   4 Sheets-Sheet 3

Inventor
C. Kajiwara,
By Clarence A. O'Brien
Attorney

Dec. 24, 1929.                C. KAJIWARA                    1,741,023
                         KAMABOKO MOLDING MACHINE
                   Filed April 2, 1928          4 Sheets-Sheet 4
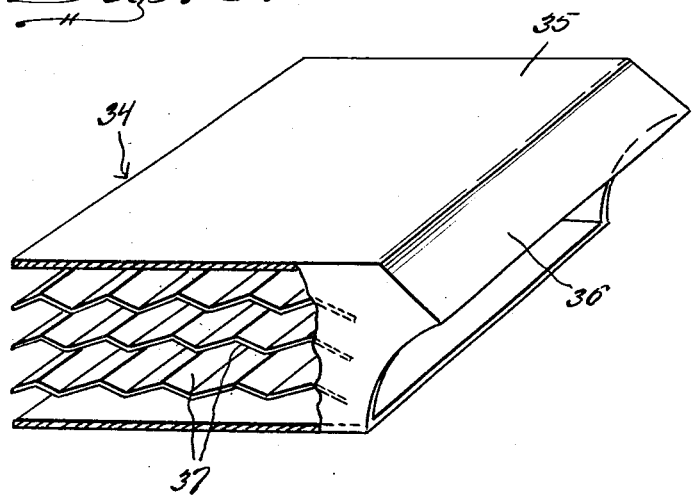
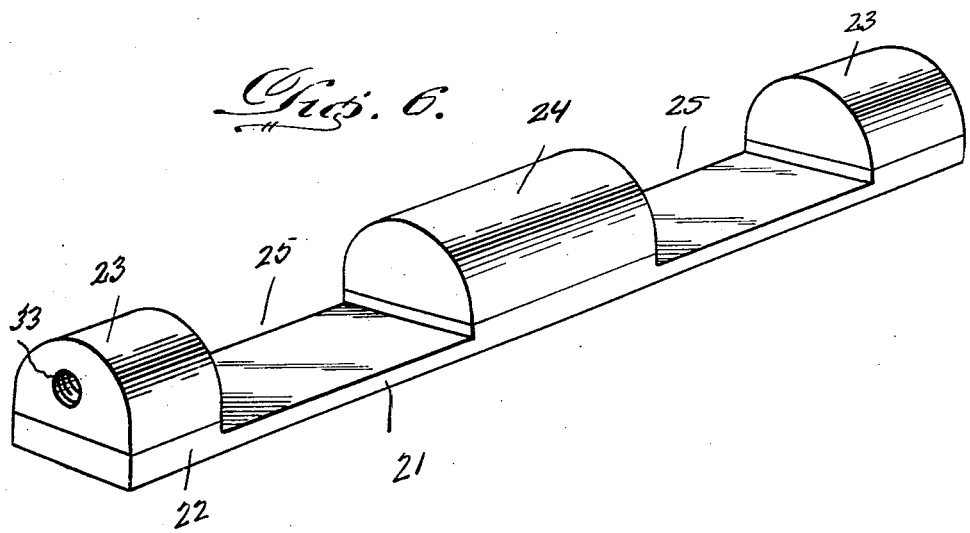
Inventor
C. Kajiwara
By Clarence A. O'Brien
                    Attorney Patented Dec. 24, 1929

1,741,023

UNITED STATES PATENT OFFICE

CHIYOKICHI KAJIWARA, OF HONOLULU, TERRITORY OF HAWAII

KAMABOKO-MOLDING MACHINE

Application filed April 2, 1928. Serial No. 266,682.

The present invention relates to a machine for making or molding "kamaboko", which is a certain type of fish cake, or sausage consumed in great quantities by the Japanese people in the Territory of Hawaii and elsewhere.

The primary object of the invention is to provide a machine of this nature which is capable of expediting the making or molding of the "kamaboko" so that the same may be shaped into its proper form, or molded cheaply and quickly and in a thoroughly efficient, uniform and reliable manner.

A further object is to provide a "kamaboko" molding machine of the above mentioned character which is simple in construction, inexpensive, strong and durable and further well adapted to the purposes for which it is designed.

Other objects and advantages will become apparent during the course of the following description.

To fully appreciate the value of the present invention, the present or prevailing method of making "kamaboko" must be understood.

The "kamaboko" as above noted is a certain type of sausage made of fish meat not entirely dissimilar to the ordinary meat or pork sausage except that the principal ingredient of the "kamaboko" is ground fish meat and not pork or beef.

Beside ground fish (boned) corn starch is used together with seasoning to make up the dough from which the "kamaboko" is made. The ingredients are mixed, kneaded, and stirred until they form a thick dough. The dough is then shaped into a semi-cylindrical form upon a piece of especially prepared board which is a predetermined size.

This shaping or molding is now done entirely by hand. One does this by holding a piece of the especially prepared board in one hand and the knife in the other, then placing the dough upon the board so as to make a ridge approximately seven inches long about one inch in height.

When the dough is so shaped or molded, it is broiled and prepared by a special process after which the finished product is ready for consumption.

It is to be noted in connection with the above description that the piece of board serves as the back bone of the "kamaboko" just as much as the thin skin over the sausage helps to keep the latter in shape.

An expert in the art can probably mold from one to two hundred "kamaboko" per hour by the prevailing method and because of the fact that it is so important to shape the "kamaboko" as nearly perfect as possible and as nearly uniform as possible, altogether too much time must be expended in this process, the result of which is that a considerable portion of the cost in the manufacture of "kamaboko" at present is used up in the molding process, which is obviously primitive, crude, inefficient and expensive.

The present molding machine constituting the invention at bar is designed so as to be operated by only two persons, although it is possible for one person to operate the machine. When operated by two persons, they can with ease turn out from fifteen hundred to two thousand "kamaboko" per hour.

The machine also has the distinct advantage of giving uniform shape and size to the kamaboko whereas when this molding of the "kamaboko" is done by hand, every finished product differs from every other product as to shape, size, and weight.

In the accompanying drawings, forming a part of this application, and wherein like numerals indicate corresponding parts:

Figure 1 is a top plan view of the "kamaboko" molding machine embodying my invention.

Figure 4 is a sectional view taken approximately on the line 4—4 of Figure 1.

Figure 5 is a detail perspective view of the kneading unit for association with the housing of the machine, parts being broken away to more clearly illustrate the corrugated spaced plates of said unit.

Figure 6 is a detail perspective view of the slidable carriage having the spaced block arranged thereon.

Figure 2:
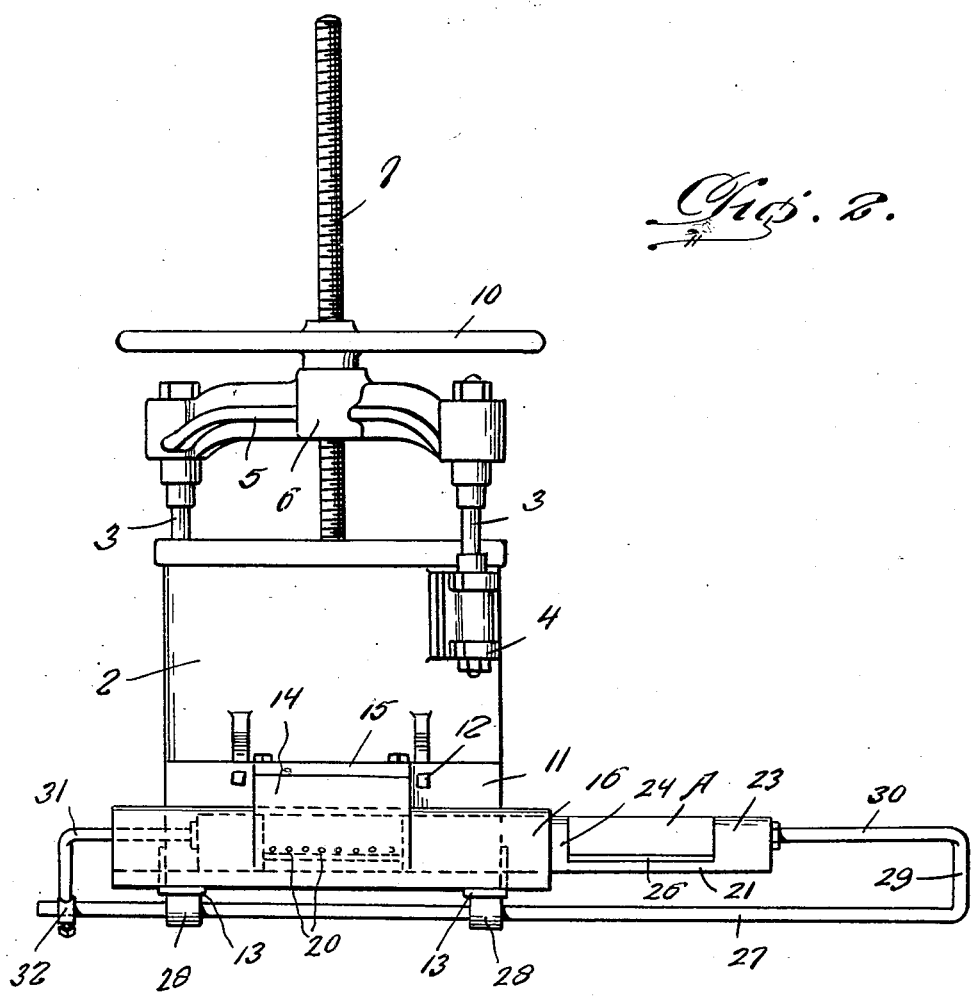
Figure 2 is a side elevation thereof.

In the drawings wherein for the purpose of illustration is shown the preferred embodiment of my invention, the numeral 1 designates a platform or table on which is secured in any appropriate manner a cylindrical tank 2 which is open at its upper end and in which is placed the dough from which the "kamaboko" is molded.

A pair of standards denoted by the numeral 3 extend upwardly from the tank 1 at diametrically opposite points, the lower ends of these standards being secured in suitable supporting brackets 4. A cross bar 5 is removably supported on the upper ends of the standards in spaced relation with respect to the top of the tank, and this cross bar is formed with a central vertically disposed hub portion 6 through which is movable the threaded shaft 7 on the lower end of which is mounted a follower or plunger 8 that is operable within the cylinder or tank 2 for forcing the dough downwardly and out through the outlet 9 provided at the side of the tank adjacent the bottom thereof, as shown very clearly in Figure 3. A hand wheel 10 is arranged directly above the hub portion 6 of the cross bar 5 for cooperation with the feed shaft 7 whereby said shaft may be raised or lowered in the manner well known in the art.

The molding machine comprehends the provision of an attaching plate 11 that is disposed vertically against the front side of the tank 2 and is secured thereto by any appropriate fastening means such as is shown at 12. This plate is formed with an opening for registration with the outlet opening 9 formed in the side of the tank 2. A pair of angle iron bars 13 extend forward from the lower corners of this plate 11 as clearly shown in Figure 1.

A substantially rectangular shaped housing 14 extends in front of the intermediate portion of the plate 11 between the angle iron side bars 13. The inner end of the housing is formed with an opening for registration with the outlet 9 formed in the side of the tank 2. The forward portion of the top of the housing is also open and a removable cover or lid 15 is provided therefor.

An elongated arched chamber 16 extends transversely through the outer end portion of the housing 14, the end portions of this chamber extending beyond the respective sides of the housing and furthermore as clearly shown in Figure 1 the ends of the chamber extend across the outer ends of the angle iron side bars 13 and are open.

Figure 3:
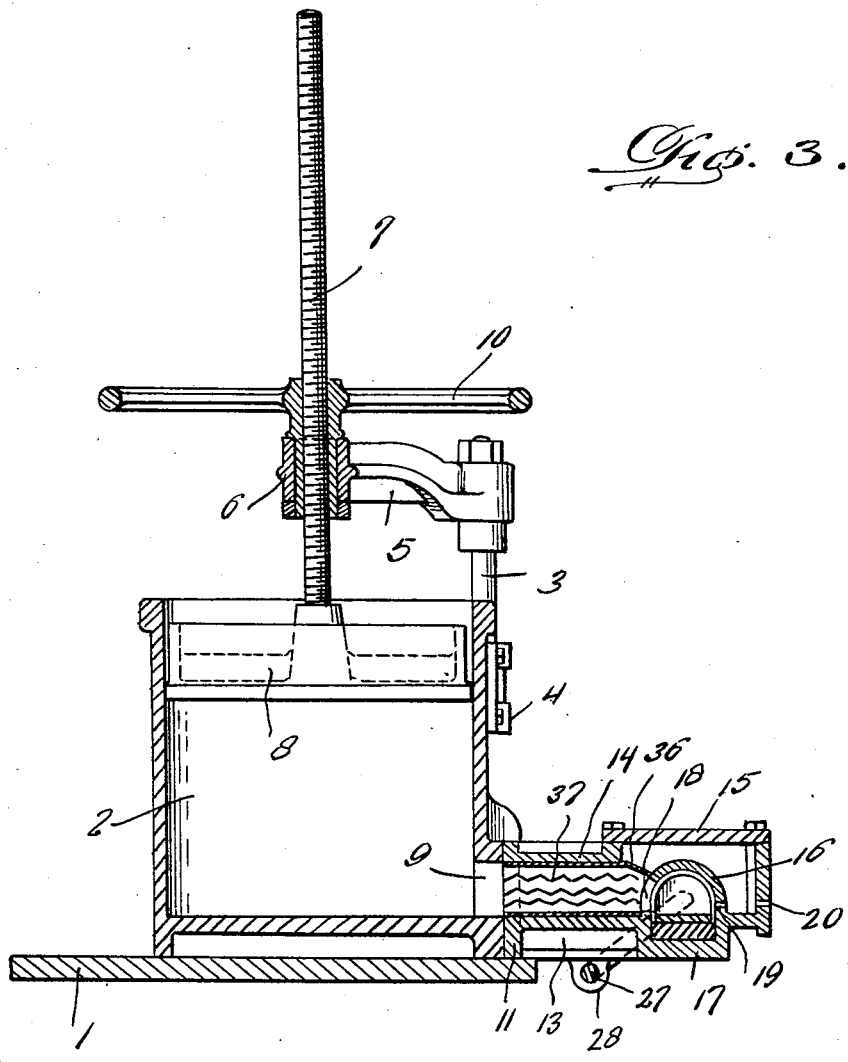
Figure 3 is a vertical sectional view taken approximately on the line 3—3 in Fig. 1 looking in the direction of the arrows.

The bottom of the housing 14 below the arch shaped chamber 16 is stamped outwardly as illustrated at 17 with reference more particularly to Figure 3 to form a base for this chamber, and the base portion extends for the full length of the chamber as shown in Figure 4.

The inner side of the intermediate portion of this arched chamber 16 is formed with a mouth 18 which is in registration with the outlet 9 formed in the lower portion of the tank 2. The outer side of the intermediate portion of this chamber 16 is formed with a series of air escape openings 19, similar openings 20 being formed in the forward end of the housing 14 and the purpose of these openings will be hereinafter more fully described.

Adapted for slidable movement through the arched chamber 16 is the elongate carriage 21 shown more specifically in Figure 6.

The carriage includes a rectangular shaped metallic base on the upper face of which are formed at the ends and also at an intermediate portion the protuberances 22.

Figure 8:
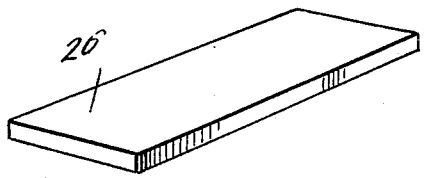
Figure 8 is a detail perspective view of the board that is removably placed on the slidable carriage to provide a base for the material being molded.

Substantially semi-cylindrical solid blocks 23 are secured on the end protuberances 22. An elongated semi-cylindrical block 24 is secured on the intermediate protuberance and these spaced blocks cooperate to provide a pair of material receiving pockets denoted by the numeral 25. These pockets are of a predetermined size and removably disposed on the upper faces of the base 21 of the slidable carriage in the spaces 25 are the boards 26 one of which is shown in detail in Figure 8.

The upper faces of the boards will lie substantially flush with the upper faces of the protuberances 22 as shown very clearly in Figure 4.

The actuating means for the slidable carriage includes an elongated rod 27 that is slidable through a pair of apertured lugs 28 arranged on the under sides of the angle iron side bar 13 inwardly of the housing 11.

One end of the rod is disposed laterally as at 28 and thence inwardly as at 29 and the free end of the inwardly disposed portion 30 is threaded into the threaded socket provided therefor in the outer end of one of the end blocks 23, see Figure 4.

A right angularly shaped rod 31 has one end threaded into the threaded socket formed in the outer end of the other block 23 while the other end of this particular rod is connected to the free end of the elongated rod 27 as at 32.

The threaded socket formed in the outer end of each semi-cylindrical block 23 is shown at 33 in the drawing with reference more particularly to Figures 4 and 6.

A dough kneading unit designated generally by the numeral 34 is adapted for disposition in the inner end portion of the housing 13 between the outlet 9 and the mouth 18 formed in the tank 2 and chamber 16 respectively. This unit 34 comprises a metallic casing of rectangular configuration, the forward and rear sides of which are open.

The downwardly inclined peak 36 extends from the upper forward edge of the casing 25 and the forward edge of this peak terminates at the top of the mouth 18.

The forward edges of the end walls of the casing 35 are shaped to cooperate with the downwardly inclined peak 6 as very clearly illustrated in Figure 5. Arranged within the casing 35 of this unit 34 are the vertically spaced corrugated plates 37 and these plates extend from the open rear side of the casing to a point adjacent the open front side and the purpose thereof is thought to be readily obvious.

The operation of my "kamaboko" molding machine may be briefly stated as follows. The dough is placed in the tank 2 after which the follower or plunger 8 is positioned in the tank. The carriage 21 is positioned within the chamber 16 after which the actuating rods are connected to the carriage. Two persons preferably operate the machine. A board 26 is placed in each of the compartments 25 and the carriage is then actuated so as to position one of the compartments in registration with the mouth 18. A rotation of the hand wheel 10 will cause the plunger 8 to force the dough out through the outlet 9 and this dough will pass into the rear end of the housing 14 through the kneading unit 34 after which the dough will enter the chamber 16 through the mouth 18 and will fill up the compartment, the board 26 acting as a back bone or base for the dough. The arched chamber will cooperate with the smooth interposed faces of the blocks 23 and 24 to properly form the "kamaboko". The carriage 21 is then actuated to move the filled compartment 25 out of one end of the chamber 16 to the position shown in Figure 2 whereby the workman on one side of the machine can readily remove the molded "kamaboko" and the board 26 on which the same adheres.

Simultaneous with this operation, the compartment at the other end of the carriage is disposed in alinement with the mouth 18 and the workman on the other side of the machine operates the hand wheel 10 to further extrude the dough from the cylinder or tank whereby the board 26 placed in the other compartment 25 will receive the dough and in this manner another "kamaboko" will be molded, and by moving the carriage in the reverse direction, this last mentioned molded "kamaboko" will be moved out of the chamber 16 where the workman can readily remove the board and the "kamaboko" formed thereon.

Figure 7:
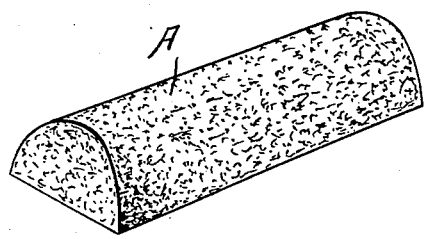
Figure 7 is a detail perspective view of the molded "kamaboko"

This operation continues, it being understood of course that when one "kamaboko" and the board therefor is removed from one of the compartments, a new board is again placed in each compartment. The molded "kamaboko" is shown A in Figure 7 as well as in Figure 2.

The carriage as well as the blocks arranged thereon are preferably constructed of brass so that the dough will not adhere thereto. The air exhaust openings 19 and 20 are preferably arranged above the line of the base 21 of the slidable carriage and these openings function to allow the air which has occupied the space within the chamber 16 just prior to the feeding of the dough into the chamber to escape.

Unlike bread or other food stuffs which should be as light as possible, the "kamaboko" is best when it is most compact and when there are no air holes in it, hence these exhaust air openings.

The exhaust air openings are very small, just large enough for a large needle to pass therethrough. The size, of course is of no importance. It would seem that dough will eventually force its way out of these holes and plug them up; but from experiments already performed by the use of the machine, the air exhaust openings appear to function without any trouble.

If desired, the kneading unit 34 may be removed, and the machine will operate without this unit.

It will thus be seen from the foregoing description that I have provided a molding machine for a particular purpose, namely for making "kamaboko" and the provision of a machine of this character will expedite the molding of the "kamaboko" and furthermore the same will be shaped into its proper form in a thoroughly efficient, uniform manner.

The parts constituting my machine are so arranged as to enable the same to be readily accessible for cleaning purposes without any difficulty.

While I have shown the preferred embodiment of my invention, it is to be understood that various changes in the size, shape, and arrangement of parts may be resorted to without departing from the spirit of the invention and the scope of the appended claims.

Having thus described the invention, what I claim as new is:—

1. In a molding machine, an elongated chamber open at its respective ends, and provided with a material receiving mouth in the intermediate portion thereof, a carriage adapted for reciprocatory movement within the chamber, said carriage including a base, end blocks arranged on the upper face of the base, a central block on the upper face of the base, said blocks cooperating to form a pair of spaced material receiving compartments, one of said compartments being disposed entirely exterior of the chamber when the other compartment is in registration with the material receiving opening formed in the intermediate portion of the chamber, a material supply receptacle provided with an outlet, a housing for feeding the extruded material from the receptacle to the mouth, a kneading unit within the housing through which the material is forced before entering the mouth in the chamber, and means for actuating the slidable carriage from either end of the chamber.

2. In a molding machine, a chamber open at one end and provided with a material receiving mouth in the side thereof, a carriage adapted for reciprocatory movement through the open end of the chamber, said carriage being provided with a material receiving compartment adapted to register with the material receiving opening formed in the side of the chamber when the carriage is in a predetermined position, a material supply receptacle provided with an outlet, a housing for feeding the material extruded from the receptacle to the mouth, and a kneading unit arranged within the housing through which the material is forced before entering the mouth in the chamber, and means for actuating the slidable carriage for positioning the compartment into or out of registration with the material receiving mouth.

3. A molding machine comprising in combination, a material receiving receptacle provided with an outlet in the side thereof adjacent its bottom, an elongated chamber supported horizontally in front of the discharge opening in the receptacle and being spaced therefrom, a housing interposed between the discharge opening in the receptacle and the adjacent side of the chamber, said side of the chamber being provided with a material receiving mouth that communicates with the housing, said chamber being open at one end, a carriage adapted for reciprocatory movement through the open end of the chamber, said carriage being provided with a material receiving pocket or compartment adapted to register with the material receiving mouth formed in the side of the chamber when the carriage is in one position, means for extruding the material from the receptacle through the housing into said material receiving compartment of the carriage, a kneading unit arranged within the housing and through which the material is forced before entering the mouth in the chamber, and means for actuating the slidable carriage from either end.

4. A molding machine comprising in combination, a material receiving receptacle provided with an outlet in the side thereof adjacent its bottom, an elongated chamber supported horizontally in front of the discharge opening in the receptacle and being spaced therefrom, a housing interposed between the discharge opening in the receptacle and the adjacent side of the chamber, said side of the chamber being provided with a material receiving mouth that communicates with the housing, said chamber being open at one end, a carriage adapted for reciprocatory movement through the open end of the chamber, said carriage being provided with a material receiving pocket or compartment adapted to register with the material receiving mouth formed in the side of the chamber when the carriage is in one position, means for extruding the material from the receptacle through the housing into said material receiving compartment of the carriage, a kneading unit arranged within the housing and through which the material is forced before entering the mouth in the chamber, and means for actuating the slidable carriage, said kneading unit comprising a plurality of vertically spaced corrugated plates arranged within the housing and extending from the open rear side thereof to the open forward end portion of the housing.

In testimony whereof I affix my signature.

CHIYOKICHI KAJIWARA.